United States Patent [19]
Murphy et al.

[11] Patent Number: 5,190,441
[45] Date of Patent: Mar. 2, 1993

[54] NOISE REDUCTION IN AIRCRAFT PROPELLERS

[75] Inventors: Guy C. Murphy, Fairfield, Ohio; Bruce J. Gordon, N. Reading, Mass.; Leroy H. Smith, Jr., Cincinnati, Ohio; Jan C. Schilling, Middletown, Ohio; Alan R. Stuart, Cincinnati, Ohio

[73] Assignee: General Electric Company

[21] Appl. No.: 566,203

[22] Filed: Aug. 13, 1990

[51] Int. Cl.$^5$ ............................................. B64C 11/48
[52] U.S. Cl. ................................ 416/129; 416/201 A; 416/237; 416/238; 415/119
[58] Field of Search ............... 416/129, 201 R, 201 A, 416/223 R, 223 A, 235, 237, 238, 242, DIG. 2, DIG. 5; 415/119

[56] References Cited

U.S. PATENT DOCUMENTS

| | | | |
|---|---|---|---|
| 1,597,175 | 8/1926 | Boening | 416/235 |
| 2,269,287 | 1/1942 | Roberts | 416/238 |
| 3,294,175 | 12/1966 | Bodner | 416/235 |
| 4,324,530 | 4/1982 | Fradenburgh et al. | 416/237 |
| 4,664,593 | 5/1987 | Hayashi et al. | 416/223 R |
| 4,883,240 | 11/1989 | Adamson et al. | 416/129 |
| 4,936,746 | 6/1990 | Mayo et al. | 416/130 |

FOREIGN PATENT DOCUMENTS

| | | | |
|---|---|---|---|
| 149598 | 7/1987 | Japan | 416/237 |
| 946794 | 1/1964 | United Kingdom | 415/119 |

Primary Examiner—Edward K. Look
Assistant Examiner—James A. Larson

[57] ABSTRACT

The invention concerns reduction of tip vortices in aircraft propellers, wherein a fence having anhedral or dihedral is attached to the blades of the propeller. Another form of the invention is applicable to counterrotating propeller systems, wherein a fence is attached to the blades of the forward propeller of the system, and no fences are attached to the aft propeller.

9 Claims, 14 Drawing Sheets

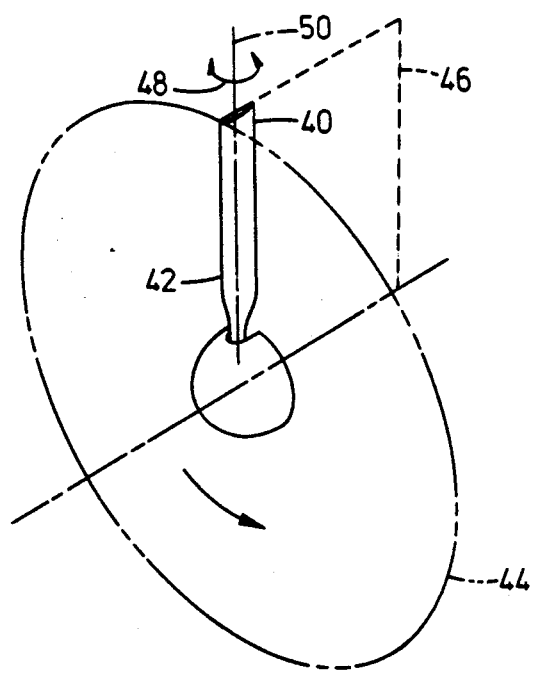
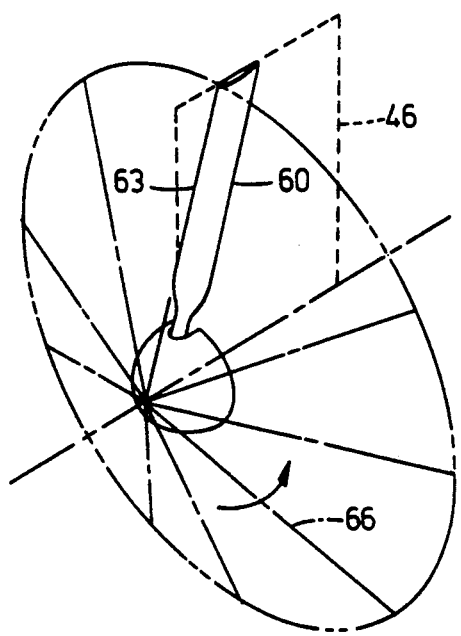
FIG. 8A    FIG. 8B
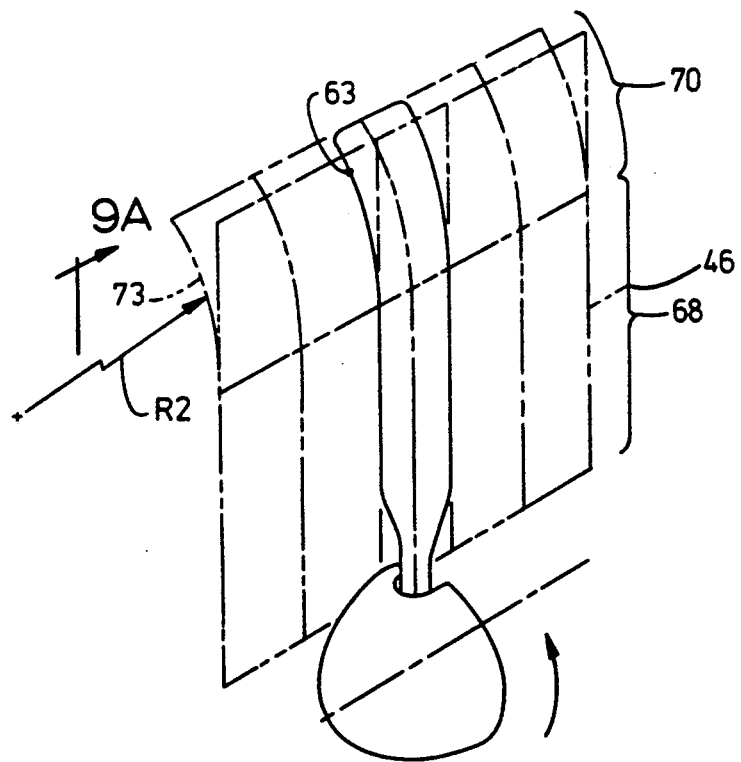
FIG. 9

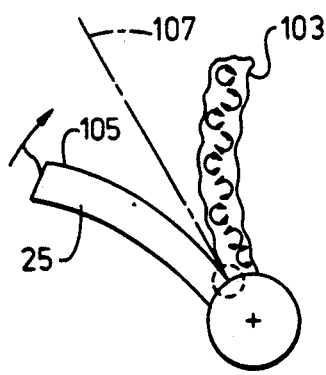
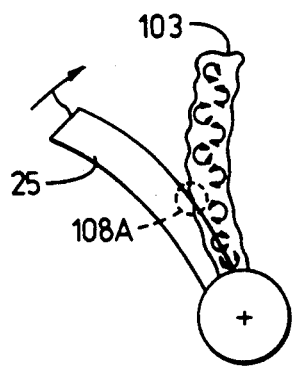
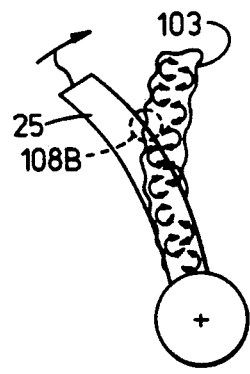
FIG. 18    FIG. 19A    FIG. 19B
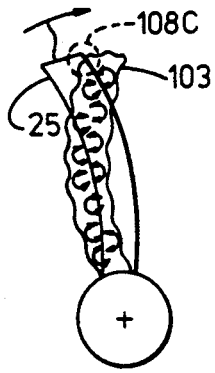
FIG. 19C
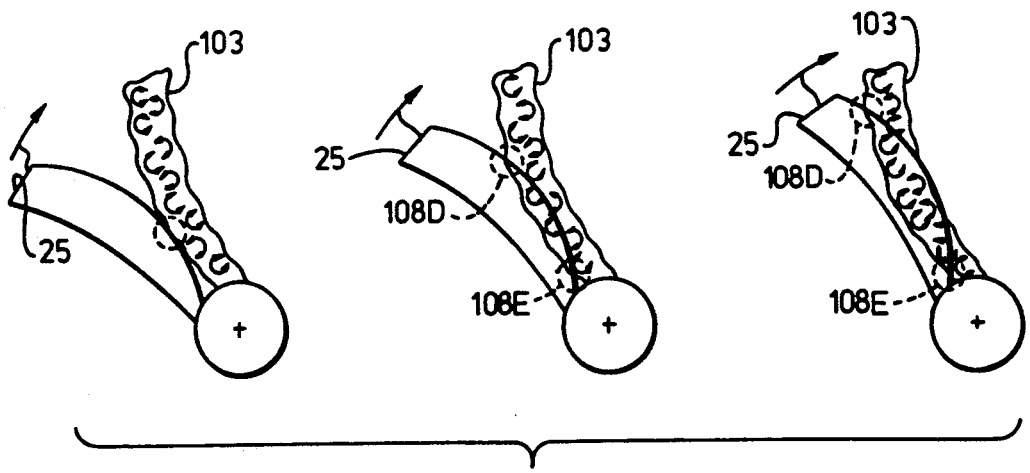
FIG. 20

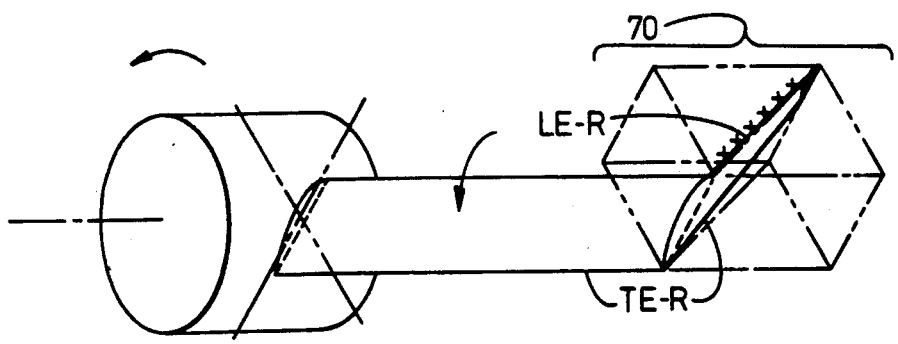
FIG. 29
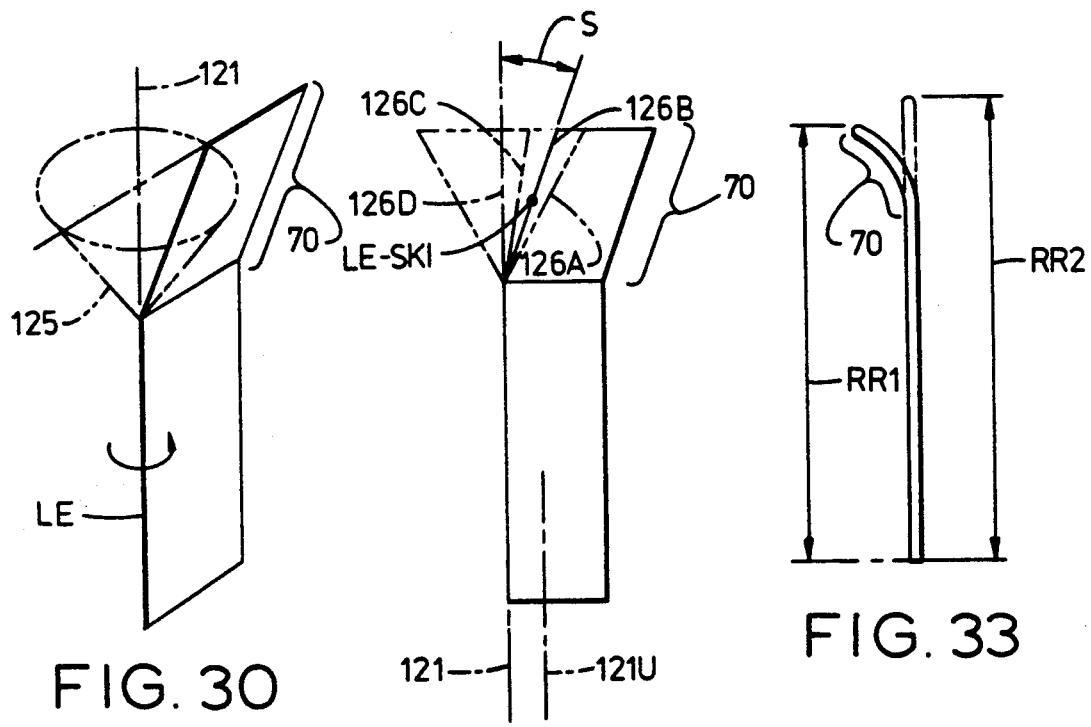
FIG. 30
FIG. 31
FIG. 33
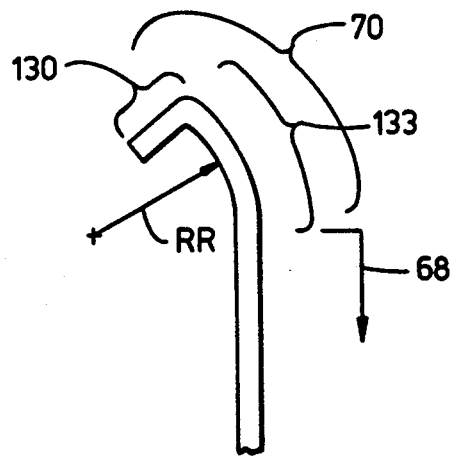
FIG. 32

NOISE REDUCTION IN AIRCRAFT PROPELLERS

The invention concerns noise-reduction in aircraft propellers. The invention further concerns noise-reduction in counterrotating propeller pairs, wherein noise is caused by vortices shed by the tips of the forward propeller into the aft propeller.

BACKGROUND OF THE INVENTION

As shown in FIG. 1, an aircraft wing 3 produces a vortex 6 at its tips. One simplified reason explaining the vortex production is illustrated in FIG. 2. The combination of (a) low pressure on the top of the wing, together with (b) higher pressure on the bottom of the wing, causes the air 9 to curl over as shown. The curling air becomes the vortex shown in FIG. 1.

Such a vortex represents a loss in energy, because the aircraft must expend energy in order to leave behind the rotating vortex. In order to reduce this loss in energy, winglets 12 in FIG. 3 have been used. It is believed that the winglets act as fences which inhibit the curling action shown in FIG. 2.

Like a wing, a propeller 15 in FIG. 4 has a high-pressure surface and a low-pressure surface, and consequently produces a tip vortex (not shown). The tip vortex can produce noise. To reduce noise, it has been suggested that the tips 18 of the blades can be modified, as shown in FIGS. 4 and 4A.

A particular type of noise can occur in one type of propeller system. For example, in the counterrotating type, as shown in FIG. 5, the forward propeller 21 rotates in direction 23, while the aft propeller 25 rotates in direction 27. The vortices 30 produced by the forward propeller travel rearward, into the aft propeller. The aft propeller "chops" each vortex, producing noise.

One reason why the chopping causes noise is that the tip vortex changes the medium through which the propeller travels. The change causes the lift of the propeller blade to momentarily change, and noise results.

As a crude analogy, a ship's propeller 33 is shown in FIG. 6, and it is operating half-submerged in water. The propeller produces a thrashing noise because the blades alternate between two media, namely, air and water. In a roughly similar way, the aft propeller 25 in FIG. 5 produces noise when it chops a vortex 30.

OBJECTS OF THE INVENTION

It is an object of the invention to provide an improved aircraft propeller.

It is a further object of the invention to reduce acoustic noise produced by aircraft propellers.

It is a further object of the invention to reduce noise produced in counterrotating propeller systems when tip vortices of the forward propeller are ingested by the aft propeller.

SUMMARY OF THE INVENTION

In one form of the invention, a fence is provided at the tips of the blades of the forward propeller in a counterrotating propeller pair, while no such fence is provided on the aft propeller. The fence reduces the size of the vortices ingested by the aft propeller.

BRIEF DESCRIPTION OF THE DRAWINGS

FIG. 8A illustrates a non-swept aircraft propeller.

FIG. 8B illustrates a swept aircraft propeller.

FIG. 9 illustrates one form of the invention.

FIG. 18 illustrates a crescent-shaped blade on the aft propeller of FIG. 16, and a mirror-image crescent-shaped wake produced by a blade (not shown) on the forward propeller.

FIGS. 19A–19C illustrate a sequence of relative positions between the blade and wake of FIG. 18.

FIG. 20 illustrates the fact that, under certain geometries, two crossing points can occur as the blade chops a wake, as opposed to the single crossing region shown in FIGS. 19A–19C.

FIG. 29 illustrates the apparatus of FIG. 28, but in reverse thrust mode.

FIG. 30 illustrates a simplified form of the invention, and shows the path traced by the leading edge of the tip region.

FIG. 31 is a side view of FIG. 30, and shows how the sweep angle of the tip region 70 changes as pitch angle changes.

FIG. 32 is similar to FIG. 11, and shows that the tip region 70 can be subdivided into two regions, namely, a fence region 130 and a blended connecting region 133.

FIG. 33 illustrates how the radius of a blade changes when the tip region 70 is straightened.

DETAILED DESCRIPTION OF THE INVENTION

Figure 7:
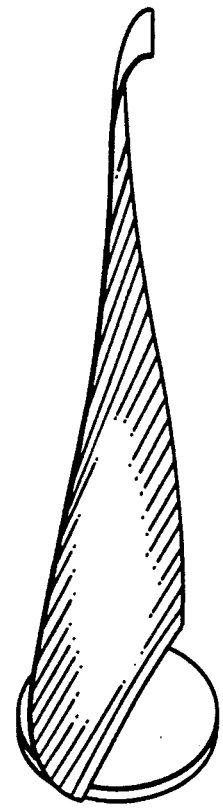
FIG. 7 illustrates one form of the invention.
Figure 7A:
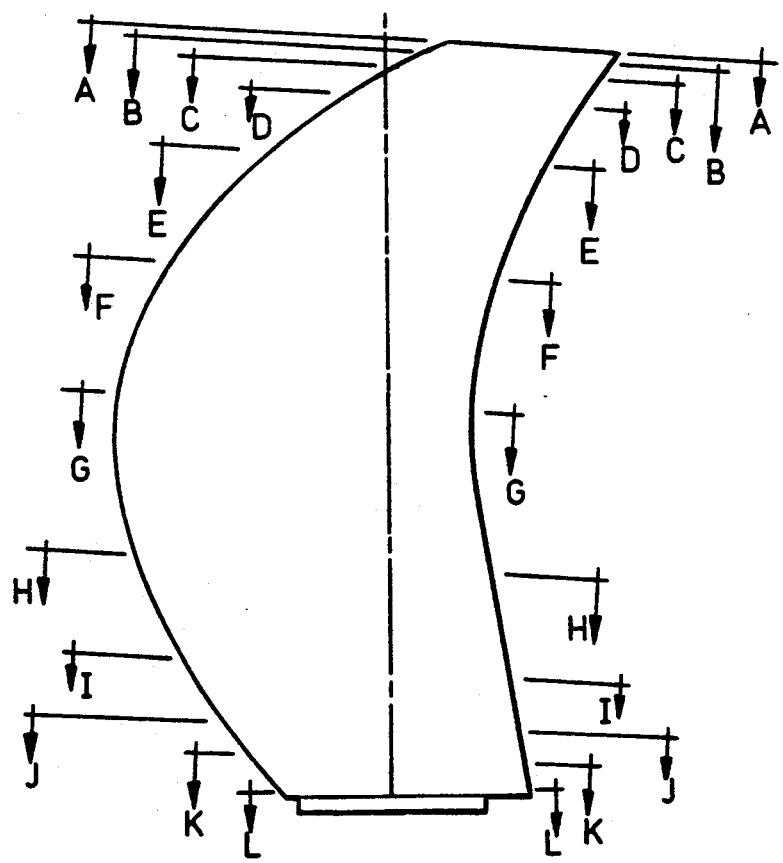
FIG. 7A illustrates a plan view of FIG. 7.
Figure 7B:
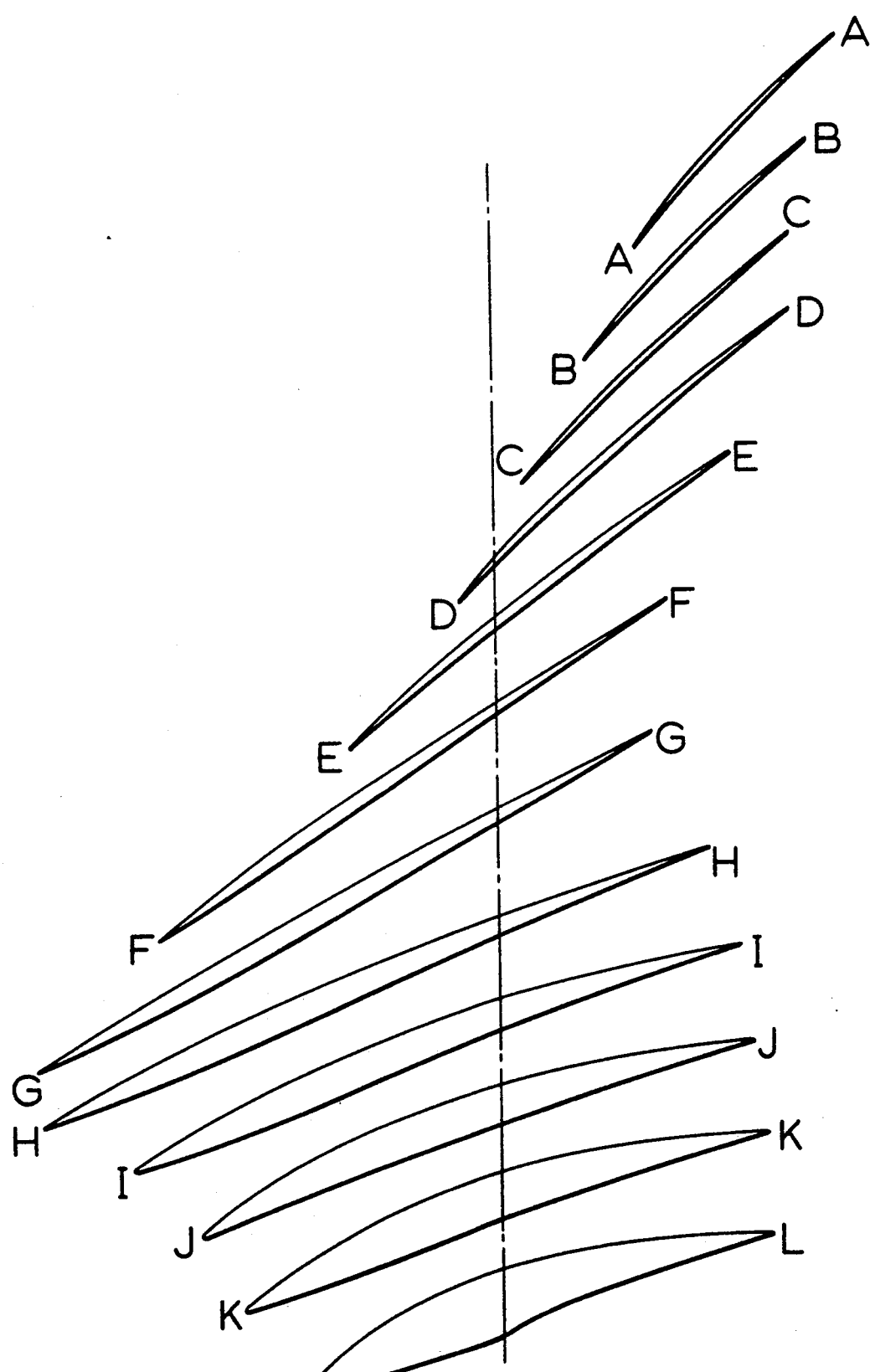
FIG. 7B illustrates the shapes and locations of respective cross-sections at various stations in FIG. 7A.

One form of the invention is shown in FIG. 7. Because of the complexity of FIG. 7, individual features will be separately explained in other Figures, beginning with sweep and anhedral.

Sweep

FIGS. 8A, 8B, 9, and 9B

FIG. 8A illustrates a propeller blade 40 having no sweep: the leading edge 42 is a radius of circle 44. For simplicity, the blade 40 is assumed to be flat: it lies entirely within axial plane 46. This assumption will be qualified later. When this blade rotates, the leading edge 42 traces out the flat disc bounded by circle 44.

(This blade 40, and all blades discussed herein, are of the variable pitch type, meaning that they can rotate about a pitch axis 50 during flight, as indicated by arrows 48 in FIG. 8A, in order to change pitch angle. Further, many of the blades herein are drawn in the feathered pitch position for simplicity.)

In contrast to FIG. 8A, FIG. 8B shows a flat propeller blade 60 which is swept: the leading edge 63 does not trace out a flat disc, but generates a conical surface 66. However, the blade is still flat, lying entirely within axial plane 46. This blade can be modified to provide one form of the invention.

Figure 9A:
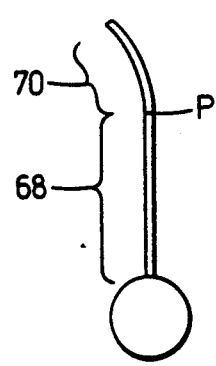
FIG. 9A is a cross-sectional view of FIG. 9, viewed in the direction of arrows 9A—9A in FIG. 9.
Figure 9B:
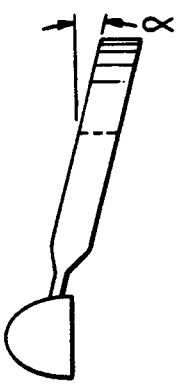
FIG. 9B is a side view of FIG. 9.

In the modification, which appears in exaggerated form in FIG. 9, the blade can be divided into two regions, namely, a body region 68 and a tip region 70. The body region 68 remains flat, within the axial plane. However, the tip region 70 is bent so that the tip region follows curved surface 73. The tip region 70 now resembles the front of a snow ski. In the tip region, the leading edge 63 retains its sweep, as the side view given in FIG. 9B indicates.

The ski tip of FIG. 9 provides a particular type of anhedral, as will now be explained.

Anhedral in General

Figure 10:
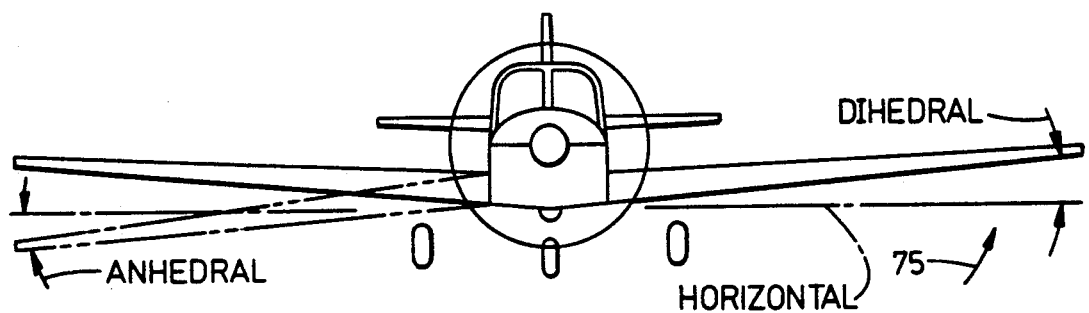
FIG. 10 illustrates anhedral and dihedral in an aircraft wing.

FIGS. 9 and 10

In a wing (as distinct from a propeller), such as that shown in FIG. 10, anhedral (or dihedral) is the angle by which the wing deviates from the horizontal. Dihedral occurs when the wing 3 (shown in solid outline) lies above the horizontal plane; anhedral would occur if the wing (shown in phantom) were to lie below the horizontal plane. (Negative dihedral is sometimes considered as positive anhedral. Cahedral is a generic term which includes both anhedral and dihedral.)

Viewed another way, dihedral occurs when the wing tip is bent toward the low-pressure side of the wing (in direction 75), while anhedral occurs when the tip is bent toward the high pressure side.

Anhedral and dihedral can be defined in similar ways for a propeller blade. For example, anhedral/dihedral can be defined with reference to the high-pressure and low-pressure sides, as stated above. The blade 60 in FIG. 9 can be defined as having anhedral because the tip has been bent toward the high-pressure side.

Anhedral of the Blade

Figure 11:
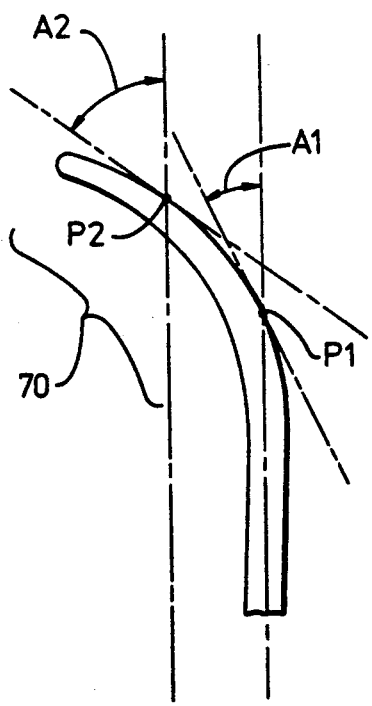
FIG. 11 is an enlarged view of tip region 70 in FIG. 9, and shows anhedral angles A1 and A2.

FIGS. 9, 9A, and 11

For the simplified blade 60 shown in FIGS. 9 and A, there are three important features relating to anhedral.

First, there is zero dihedral in the blade body 68. Second, there is significant anhedral in the tip region 70. Third, the amount of anhedral in the tip region is continuously increasing toward the blade tip.

This third feature is more clearly shown in FIG. 11, which is an enlargement of the tip region 7A of FIG. 9A. The anhedral increases toward the tip (i.e., as radius increases), as measurement at two points will show. At the first point Pl, the anhedral is given by angle Al between a tangent line and a line parallel to a radius. (The radius is analogous to the horizontal line of FIG. 10). At the second point, P2, the anhedral is given by angle A2, and is larger than the first anhedral. Since the second point P2 is located at a larger radius than the first point Pl, anhedral increases in as radius increases.

Preferably, the dihedral/anhedral in the tip is nearly zero where the blade body meets the tip region, at point P in FIG. 9A, and steadily increases to between 45 and 60 degrees at the very tip.

Continuously Increasing Sweep

Figure 12:
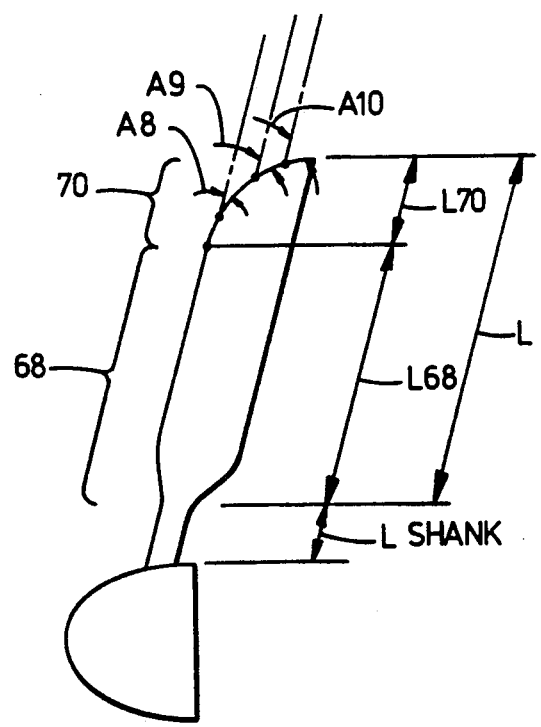
FIG. 12 shows increasing sweep angle in the tip region 70 of a propeller.

FIGS. 9, 9B, and 12

The sweep described above was assumed to be constant. In another form of the invention, the sweep in the tip region 70 of FIG. 9 continuously increases toward the blade tip. This concept can be explained with reference to FIG. 12, which shows a flat blade. The flat blade has uniform sweep in the blade body 68. Then, in the tip region 70, the leading edge progressively curves aft, as shown, so that the sweep angle continuously increases toward the tip. Specifically, angle A10 exceeds angle A9, which exceeds angle A8, and so on.

When the flat blade having such sweep at the tip is bent as shown in FIGS. 9 and 9B, the continuously increasing sweep in the tip region 70 is retained. Thus, such a blade has two features: (1) increasing sweep toward the tip, and, as described previously, (2) increasing anhedral toward the tip.

Trailing Edge Sweep

FIG. 13

In addition to the sweep of the leading edge, the trailing edge of the tip region also has sweep. However, for each leading edge position, the trailing edge sweep is less than the leading edge sweep. A simplified example will illustrate this difference in sweep.

Figure 13:
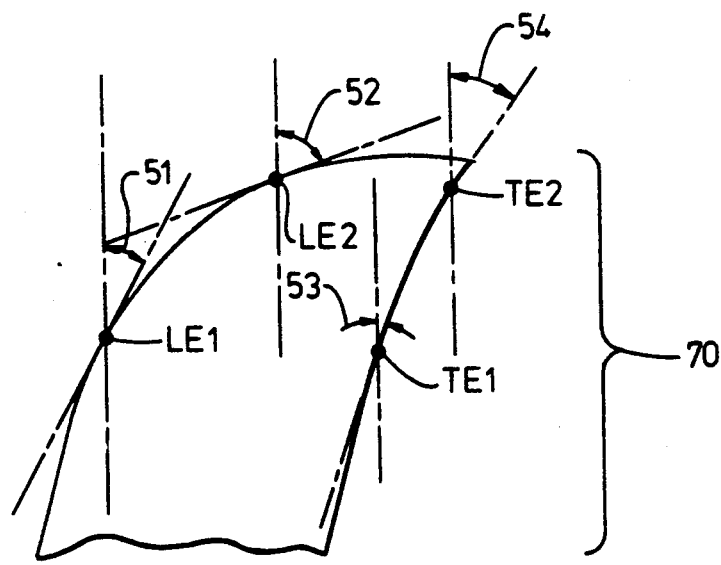
FIG. 13 shows the relative sweep of the trailing edge as compared with that of the leading edge of one form of the invention.

In FIG. 13, two leading edge positions are indicated, LE1 and LE2. Directly aft the leading edge positions are respective trailing edge positions TE1 and TE2. The sweep of each trailing edge position (S3 and S4) is less than the respective sweep of the leading edge position (S1 and S2).

When the blade is bent into the shape show in FIG. 9, this feature of lesser sweep at the trailing edge is retained, as a drawing resembling FIG. 9B would indicate.

Length of Tip Region

FIG. 12

The length L70 of the tip region 70 in FIG. 12 is preferably 5 to 10 percent of the total length (body plus tip: L68 plus L70) of the blade. That is, for example, if the total length L is 65 inches, then the tip length lies between 3.25 and 6.5 inches. The length of the shank, LSHANK, is not included in the total length because, in the preferred embodiment, such length is negligible.

"Blade Line"

FIG. 14

Figure 14:
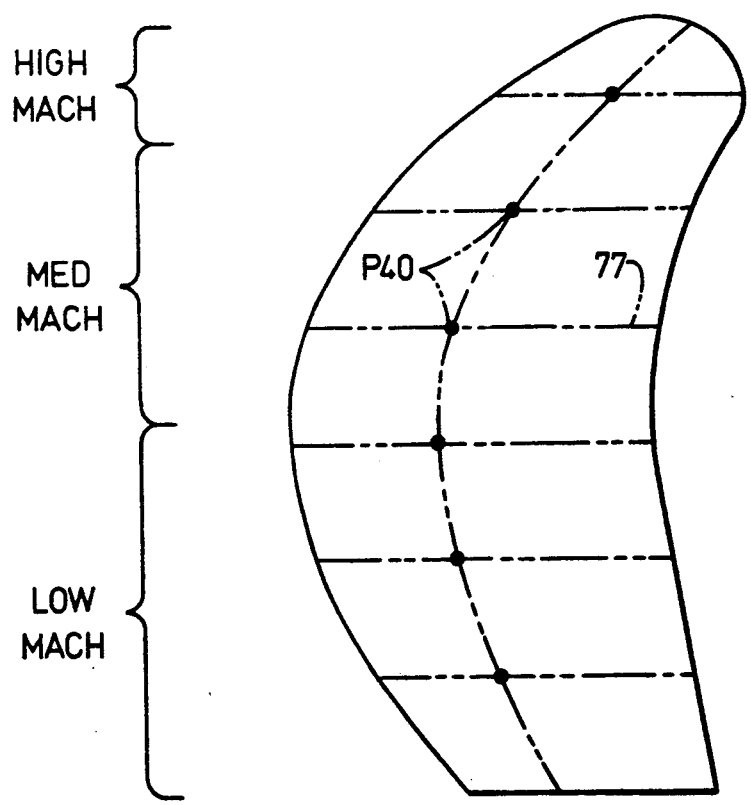
FIG. 14 illustrates an explanation of the term "blade line."
Figure 16:
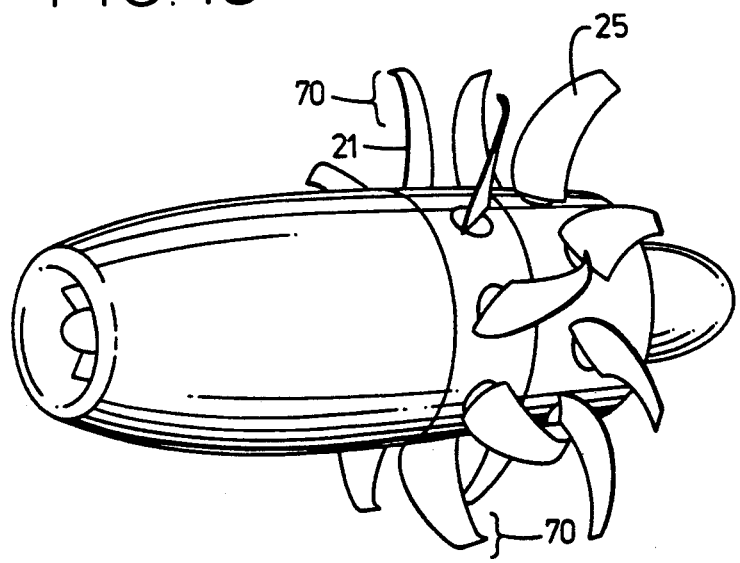
FIG. 16 shows one form of the invention, wherein the fore propeller only in a counterrotating pair is equipped with ski tips, in order to reduce vortex ingestion by the aft propeller.

"Blade line" is a term of art, and refers to a reference line on the blade which can be generated in three steps. First, one draws the mean chord lines at several radial locations. FIG. 14 shows such chord lines. Second, one measures each chord length and draws a point P40 located, on each chord line, at 40% of the chord length from the leading edge. For example, if chord 77 is ten inches long, the point is drawn four inches from the leading edge, as indicated. Third, as shown in FIG. 16, one draws a curve connecting all of the 40%-points. This curve is the blade line.

For a flat blade of FIG. 14, the blade line is a curve lying in a single plane. This blade line is a two-dimensional curve. However, for the swept ski-tip blade of FIG. 9, the blade line lies along the curved surface 73. This blade line is approximately helical; it is a three-dimensional curve.

Figure 15:
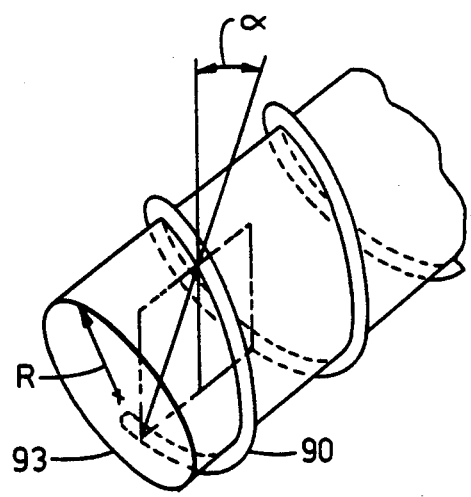
FIG. 15 shows the helical thread on a common bolt.

The blade line for the ski tip is only approximately helical. It need not be perfectly helical and, in fact, probably will not be such. The reason can be given by example. The thread 90 of a bolt is a helix, as shown in FIG. 15. The shaft 93 of the bolt is a cylinder, which, by definition, has a constant radius. The thread of the bolt has a pitch angle which is constant at all points on the thread. (Thread pitch angle should not be confused with blade pitch angle.) Thus, the thread of a bolt is a helix.

As to the blade line, the radius R2 of the curved surface 73 (over which the tip region 70 is bent) in FIG. 9 corresponds (for helix purposes) to the radius of the bolt in FIG. 15. Since the curved surface 73 in FIG. 9 need not be a cylinder, the radius R2 of the blade line need not be constant. Similarly, the "pitch angle," shown in FIG. 9B, of the blade line need not be constant. (This "pitch angle," which is a helix pitch angle and which is analogous to the thread pitch angle of the bolt, should also not be confused with blade pitch angle.) Therefore, the blade line is not necessarily helical.

Nevertheless, the blade line does lie on a curve (namely, curved surface 73 in FIG. 9), and, because the blade line does extend aftward, it does have a type of helix pitch angle, (namely, angles A8, A9, and A10 in FIG. 12). Therefore, even though the blade line need not be helical in a strict sense, it can be called "quasi-helical" because (1) it lies on a curved surface (2) it extends fore-to-aft.

Use of Ski-Tip in Counterrotating Systems

FIG. 16

Figure 5:
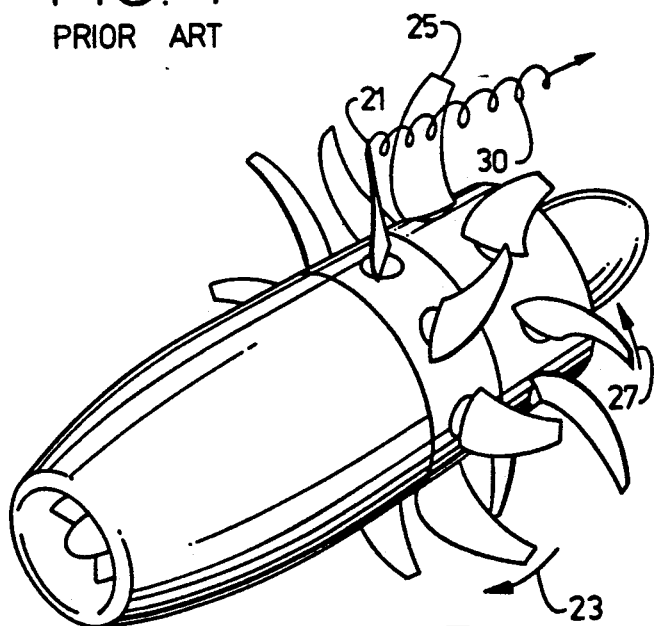
FIG. 5 illustrates a counterrotating propeller system in which tip vortices 30 produced by the fore propeller are ingested by the aft propeller.
Figure 6:
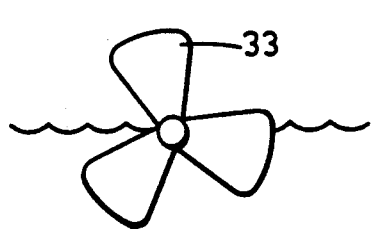
FIG. 6 illustrates a ship's propeller in water.

The ski-tip of the invention can be added to the counterrotating system of FIG. 5, as shown in Figure 16. However, the ski-tips are added to the fore propeller 21 exclusively, and not to the aft propeller 25, in order to reduce the strength of the tip vortices 30 shed by the fore propeller into the aft propeller. No ski-tips are placed on the aft propeller 25 because there is no third propeller following the aft propeller to chop the aft propeller's vortices. Restated, the tips on the aft propeller have no significant dihedral.

Wake-Chopping Noise Changes when Anhedral Changes to Dihedral.

Scissoring Action Explained First

FIGS. 17-19

Anhedral in the ski tips has been discussed above. In another form of the invention, dihedral (instead of anhedral) can be advantageous in a counterrotating system, such as that in FIG. 16, as will now be explained.

Figure 17:
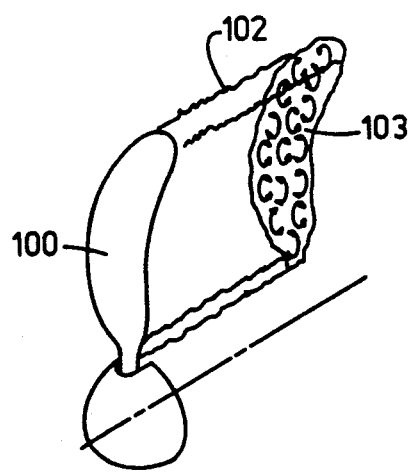
FIG. 17 illustrates, schematically, the crescent-shaped wake produced by a crescent-shaped blade.

The blade 100 in FIG. 17 is generally crescent-shaped, and produces a wake 102 which is crescent-shaped in cross-section, as schematically indicated by hatched cross section 103. The aft blades 25 in Figure 16 chop the crescent wakes (not shown). The shape of the aft blades is significant, because the shape determines whether the wake is chopped all at once or in separate sections. The former produces more noise than the latter.

In this connection, two important features of the blade shape of FIG. 18 are the following. First, the leading edge 105 is crescent-shaped, and, second, the crescent is in mirror-image to the wake 103, as indicated by mirror 107. Consequently, the aft blade chops the crescent wake at one section 108 at a time, as shown in FIGS. 19A-19C. In that sequence of Figures, as rotation proceeds, the chopped section 108 moves radially outward. (It is possible, under some geometric configurations, that the aft blade will chop the wake at two positions, namely, 108D and 108E in FIG. 20, instead of a single position. Nevertheless, in this case, the noise will still be less than if the entire wake is cut at one time.)

Restated, the crescent wake and the crescent leading edge together execute a scissoring action when they cross, with the "cutting region" 108 in FIGS. 19A-19C moving radially outward as the crescents pass each other. The scissoring action splits the overall chopping of the crescent wake into many individual chops. The chopping noise can now be viewed as a sequence of small noise pulses, spread out over time, rather than the large pulse which would occur if the entire crescent wake were chopped at once. The scissoring action can be enhanced by adding ski-tips having dihedral, rather than anhedral, to the forward propeller, as will now be explained.

Dihedral on Forward Propeller can Enhance Scissoring

Figure 21:
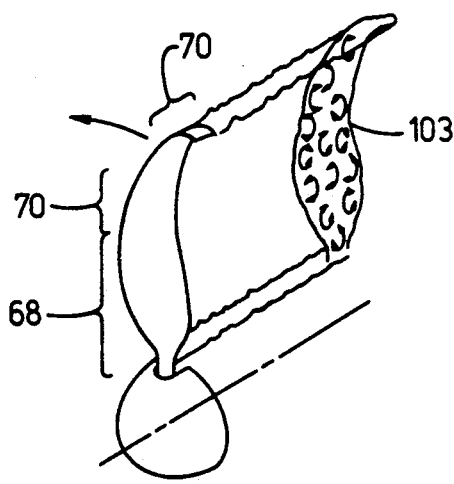
FIG. 21 illustrates a C-shaped wake produced by a blade having dihedral at its tip.
Figure 22:
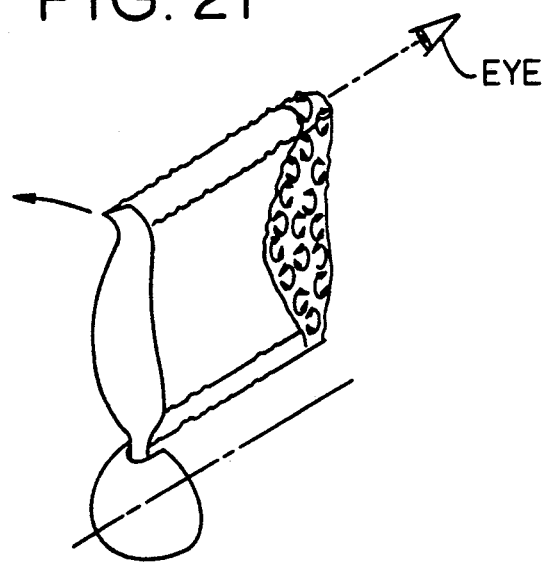
FIG. 22 illustrates an S-shaped wake produced by a blade having anhedral at its tip.

FIGS. 21 and 22

Figure 21A:
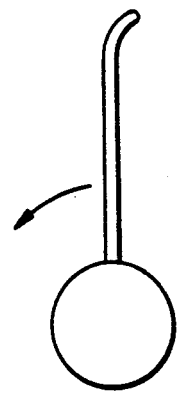
FIG. 21A is a cross-sectional view of FIG. 21.

If the ski-tip has dihedral, as shown in FIGS. 21 and 21A, then the ski-tip adds a wakelet to the crescent wake, as shown in FIG. 21. This particular wakelet has the same sense of curvature as the crescent wake, meaning that the concave aspect of the crescent is maintained in both the crescent wake (produced by the blade body) and in the wakelet (produced by the ski tip): the overall wake maintains its general C-shape.

Figure 22A:
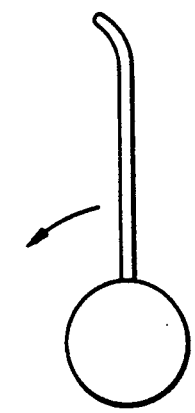
FIG. 22A is a cross-sectional view of FIG. 22.

In contrast, if the ski tip had anhedral, as in FIGS. 22 and 22A, the wakelet would have an opposite sense of curvature, as shown in FIG. 22. The opposite curvature converts the previous C-shaped wake into an S-shaped wake, as shown. In the S-shaped wake, the sense of curvature changes at the inflection point: the wake, when viewed by the EYE, changes from concave (in the crescent part) to convex (in the wakelet part).

Figure 23:
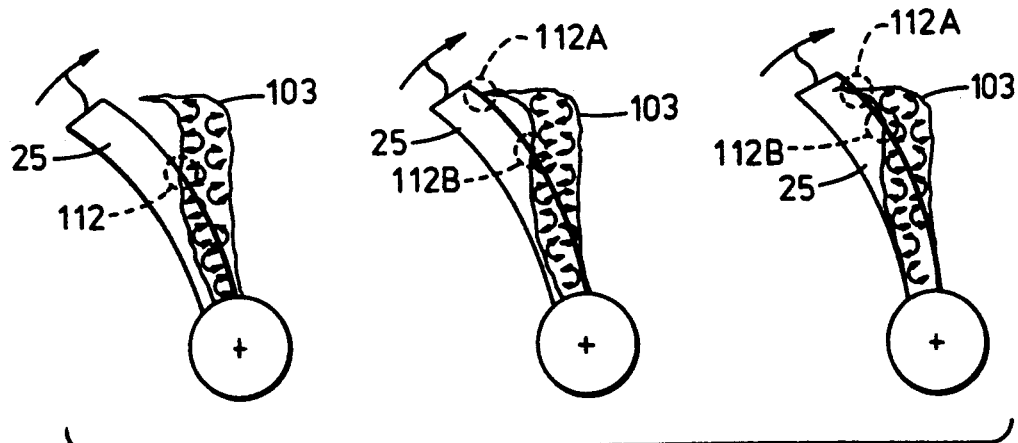
FIG. 23 illustrates a sequence of crossings wherein a blade chops the S-shaped wake of FIG. 22.

The sense of curvature of the wakelet is important because it affects the scissoring action. As shown in the sequence of FIG. 23, with an S-shaped wake, the scissoring occurs at a single moving location 112 until the crescent blade reaches the wakelet. Then, because the sense of curvature changes in the wakelet, the single chopping region transforms into two regions 112A and 112B and noise increases.

Figure 24:
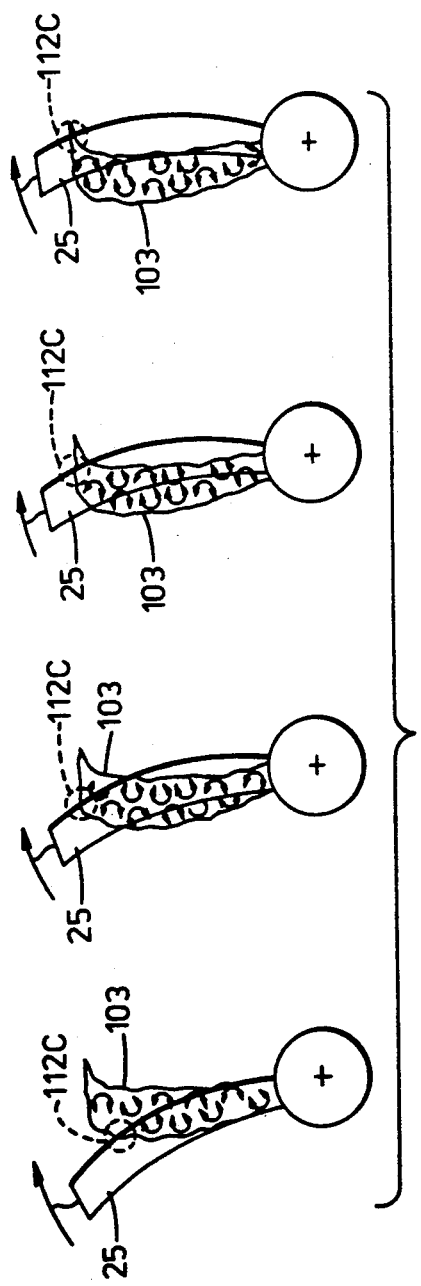
FIG. 24 illustrates a sequence of crossings wherein a blade chops the C-shaped wake of FIG. 21.

In contrast, with the C-shaped wake of FIG. 21 (produced by a forward blade having dihedral at the tip), two chopping regions do not arise when the wakelet is cut. Instead, as shown by the sequence of FIG. 24, a single chopping region 112C moves radially outward as the aft blade 25 chops the wake. Less noise is produced in chopping the wakelet than in the case of the S-shaped wake of FIG. 23.

Therefore, when the wakelet has the same sense of curvature as the crescent wake, a single chopping region occurs in the wakelet. When the wakelet has the opposite sense of curvature, two chopping regions can occur. In the latter case, more wake-chopping noise can be produced.

Blade Twist in the Tip Region

Figure 26:
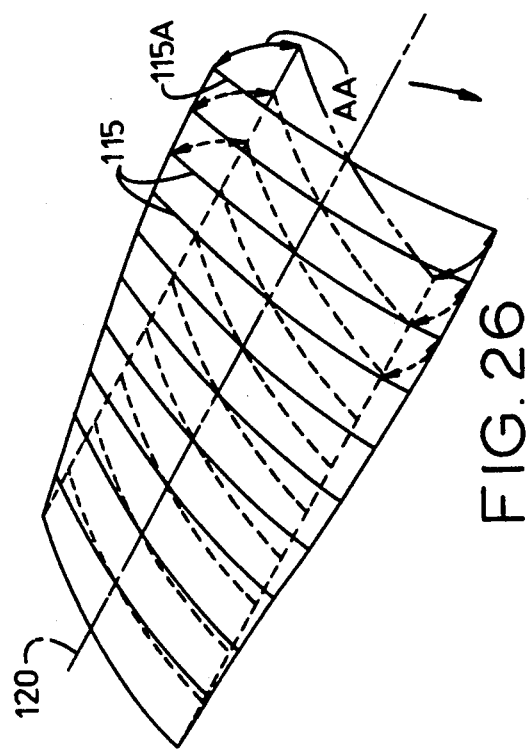
FIG. 26 illustrates twist in a propeller blade.
Figure 25:
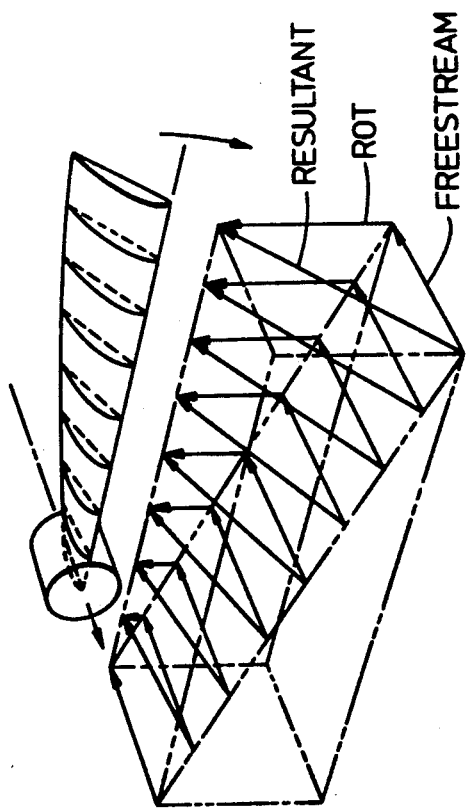
FIG. 25 illustrates the change in the conditions of the incoming air which occurs at different positions on a propeller blade.

FIGS. 25 and 26

In general, a propeller blade has a feature called twist, which exists because the incoming airstreams are different in both speed and direction at different radial positions on the propeller. For example, in FIG. 25, the airstream striking the propeller can be divided into two components, namely, FREESTREAM (due to the forward motion of the propeller) and ROT (due to the rotation of the propeller.) The former can be viewed as constant in speed and direction. However, the latter is always tangential to the propeller, but the speed changes as radius changes: the speed is equal to wr, wherein w is rotational speed in radians per second, and r is radius.

The actual incoming airstream to the blade is the vector sum (labeled RESULTANT) of these two component vectors, and is sketched in FIG. 25. The reader can see that the RESULTANT vector changes in both speed and angle as radius changes. This change means that the angle of attack of a flat propeller blade will be different at different radial positions. Therefore, propeller blades are generally not made to be flat, but are given twist.

Twist is shown in FIG. 26. The foil sections 115 at different radii are rotated (or twisted) about axis 120. For example, foil section 115A is twisted by an angle AA with respect to a flat reference plane. The twist reduces the difference in angle of attack, at different radial positions, caused by the different RESULTANT airstreams of FIG. 25.

Figure 27:
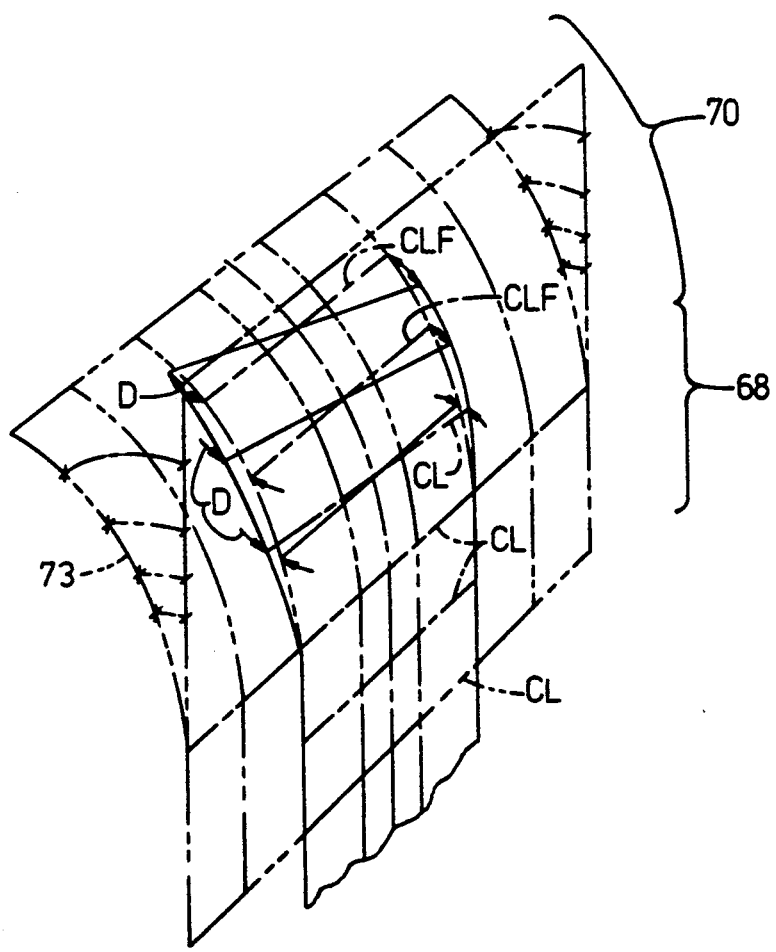
FIG. 27 illustrates twist in the tip region 70 of one form of the invention.

In one form of the invention, the twist of the blade is retained in the bent tip region 70 in FIG. 9. This retention of twist is schematically shown in FIG. 27. The blade body 68 is shown as flat for simplicity; in general, however, it will have twist, as does the blade of FIG. 26.

The tip region 70 also has twist, which will be explained by reference to a flat, untwisted blade which would be produced by bending over curved surface 73. In such a case, the chord lines of the flat, bent blade are labeled CLF. These chord lines CLF lie on the curved surface 73. However, for the twisted blade, the chord lines do not lie in the curved surface 73 as indicated by angles D. In a sense, curved centerline 120 in FIG. 27 corresponds to centerline 120 in FIG. 26, and angles AA and D in these two Figures are analogous.

Therefore, in this form of the invention, any or all of the following occur in the tip region 70: (1) twist, which may increase as radius increases; (2) cahedral, which may increase as radius increases; (3) sweep, which may increase as radius increases; and (4) lifting foil sections.

Several features of behavior of the invention described above are the following.

Anhedral of Ski-tip Changes to Dihedral in Reverse Thrust

Figure 28:
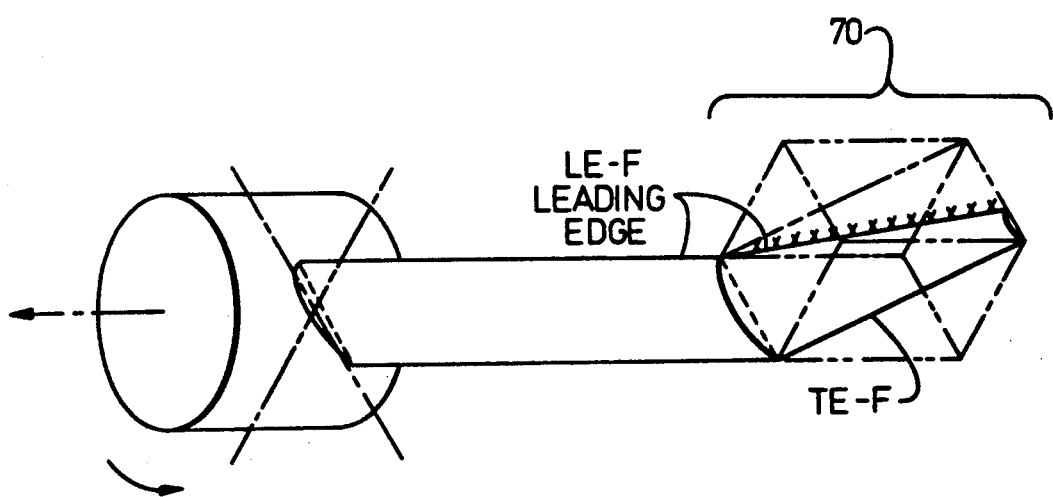
FIG. 28 illustrates a simplified form of the invention operating in forward thrust mode.

FIGS. 28 and 29

A simplified example of entering reverse thrust will now be given. When the aircraft touches down at landing, the pilot (or automatic control system) reverses pitch of the blades. For forward pitch, a simplified blade, having a flat (non-curved) tip region 70, is shown in FIG. 28. FIG. 29 shows pitch for reverse thrust. A reference box is superimposed on each in order to show orientation of the ski tip. Further, the space in front of the leading edge of the ski tip in FIG. 28 has been hatched, and the new position of the hatched region in FIG. 29 shows how the leading edge has moved. The characteristics of the blade change when the blade is driven from forward into reverse pitch, as will now be explained.

The ski tip shown in FIG. 28 has (a) anhedral (ie, it bends toward the pressure side), (b) leading edge sweep, and (c) the leading edge sweep is greater than the trailing edge sweep at all leading edge locations.

However, in reverse pitch, these characteristics are juxtaposed. The trailing edge in forward thrust (designated TE-F in FIG. 28) becomes the leading edge in reverse thrust (LE-R in FIG. 29). Conversely, the leading edge in forward thrust (LE-F) becomes the trailing edge in reverse thrust (TE-R).

Further, when the direction of thrust changes, the algebraic sign of tip cahedral changes. For example, the ski-tip of FIG. 28 has anhedral. In FIG. 29, it has dihedral. The algebraic sign has changed. In addition, the leading edge sweep of the tip changes: since the trailing edge in forward thrust (TE-F) becomes the leading edge in reverse thrust (LE-R), the leading edge sweep in reverse thrust is determined by the geometry of TE-F, but when moved to the leading edge position. This is a specific case of a more general situation of change in sweep which occurs as pitch change occurs, as will now be explained.

Tip Sweep Changes as Pitch Changes

FIGS. 30 and 31

FIG. 30 illustrates a simplified blade with a flat ski-tip 70. Let it be assumed that the pitch axis 121 coincides with the leading edge LE. (In general, such is not the case, but this assumption simplifies the geometry.) When pitch changes, the leading edge of the ski tip 70, LE-SKI, traces out cone 125. When the situation is viewed from the side, as in FIG. 31, LE-SKI adopts successive positions 126A through 126D as pitch changes. Therefore, the sweep angle S of the leading edge of the ski-tip changes as pitch changes.

This type of change in sweep angle also occurs when the pitch axis is located at its usual position 121U in FIG. 31, but is more difficult to illustrate. Further, this type of change also occurs when the tip is not flat, but has continuously increasing cahedral, as with the anhedral of FIG. 9.

Figure 34:
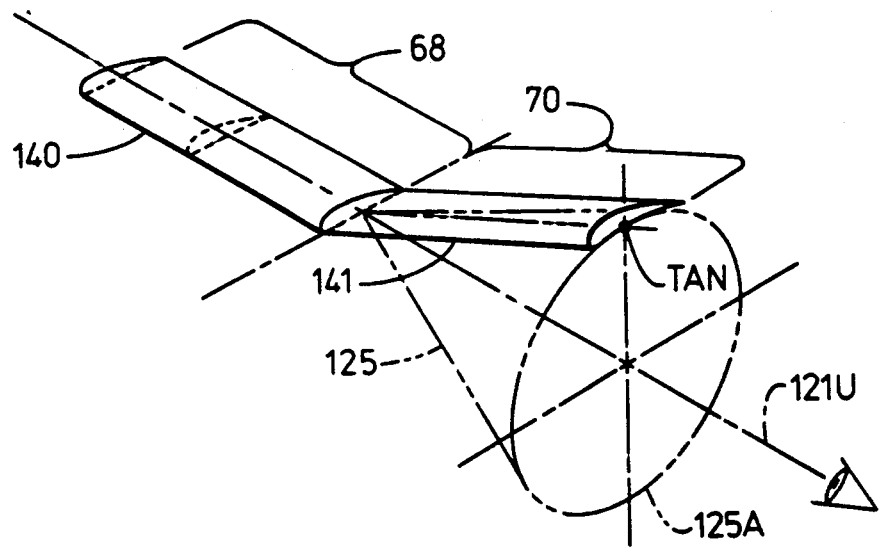
FIG. 34 illustrates a simplified blade having a tip region 70 having no cahedral.
Figure 35:
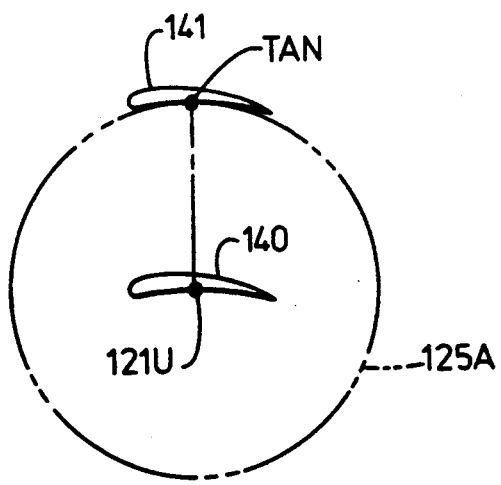
FIGS. 35 and 36 illustrate that pitch angles in the tip region 70 change in unison with those in the blade body 68.
Figure 36:
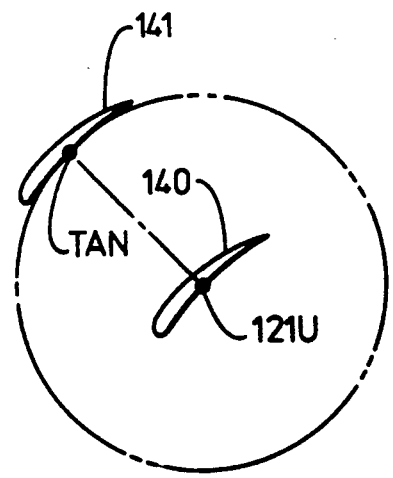

Pitch Angle in Tip is Same as in Blade Body
FIGS. 34-36

FIG. 34 shows a simplified blade with a flat tip region 70. Two foil sections are shown, one in the blade body 68 and one in the tip region 70. When pitch changes (ie, the blade rotates about pitch axis 121U), the tip region 70 traces out a cone 125. Foil section 141 can be viewed as tangent to the cone base 125A at point TAN.

Foil sections 140 and 141 change pitch in unison, as shown in FIGS. 35 and 36. Therefore, the pitch angles in the tip region 70 remain substantially the same as those in the blade body 68.

Invention can be Considered as Fence Attached by Blended Foil Surface
FIG. 32

Figure 4:
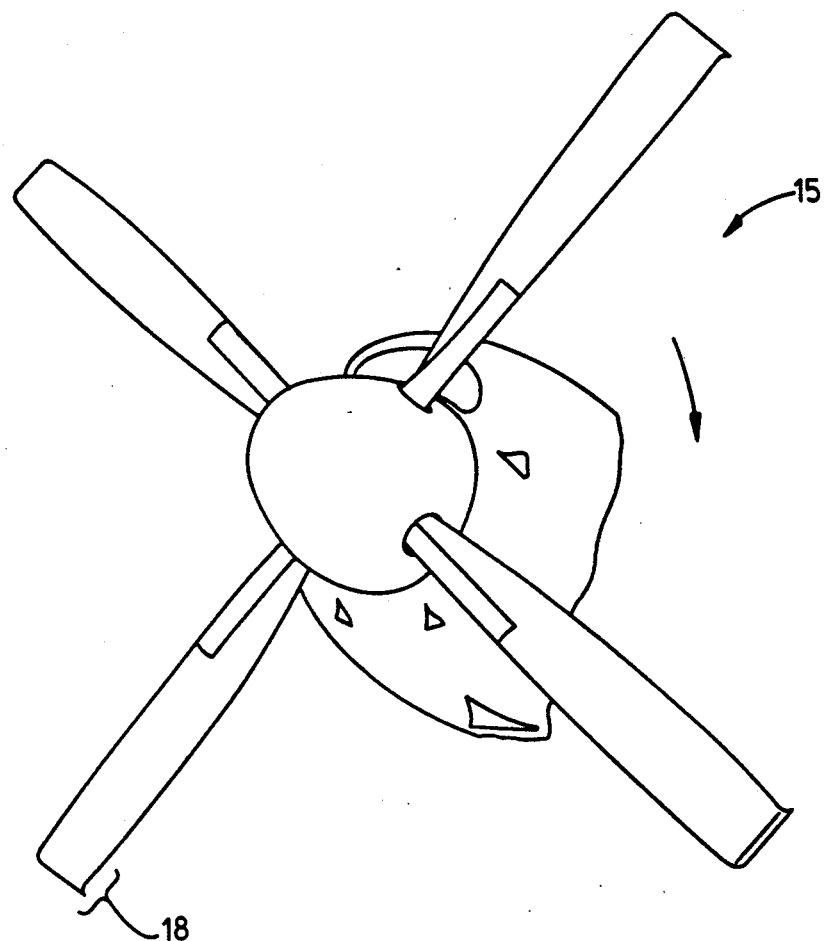
FIG. 4 and 4A illustrate aircraft propellers.
Figure 4A:
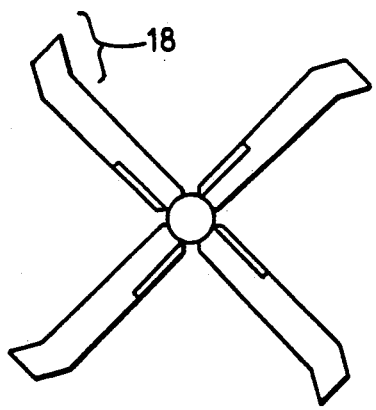

The invention can be viewed as a fence 130 in FIG. 32 which is attached to the blade body 68 by a blending foil surface 133. The blending foil surface has a radius of curvature RR greater than 5 inches at all points. This radius is distinct from the prior-art geometry of FIG. 4, which shows a ninety-degree bend.

One reason for using a larger radius of curvature in the invention is to prevent excessive mach numbers from occurring. The local mach number can exceed 1.0 at a sharp bend, as in FIG. 4, even if nearby mach numbers are below 1.0. It is not desirable to exceed mach 1.0, because shocks are induced which cause drag. The larger radius of curvature (ie, the blending) of the invention inhibits shock formation.

Ski-Tips Reduce Propeller Diameter
FIG. 33

The tip region 70 in FIG. 33 provides thrust; it is of lifting cross-section. Thus, speaking approximately, if the tip region 70 were straightened, as shown by the phantom region in FIG. 33, the radius would change from RR1 to RR2. However, both blades would provide approximately equal thrust.

Consequently, in the invention, the diameter of the forward propeller 21 can be less than that of the aft propeller 25, yet both can produce equal thrust, or at least a thrust difference of less than ten percent For example, if the aft propeller is 12 feet (144 inches) in diameter, the forward propeller can be 11 feet 9 inches (141 inches). That is, the diameter of the forward propeller is 98.5 (ie, 141/144) percent of the diameter of the aft propeller, for a 12-foot aft propeller.

Blade is not Flat: it has Foil Cross-Section

In the discussion above, the blade body 68 in FIG. 9 has been described as flat for simplicity. However, in practice, the blade body, like a propeller blade in general, is not flat, but is an airfoil.

Further, the blade body need not have zero dihedral. For balance purposes, and other mechanical reasons, the blade body can have a dihedral ranging between positive and negative 3 degrees at different positions, measured when the blade is non-rotating. However, during rotation, centrifugal stresses tend to reduce the dihedrals to near zero. Thus, dihedrals in this range can be viewed as approximately zero.

Figure 1:
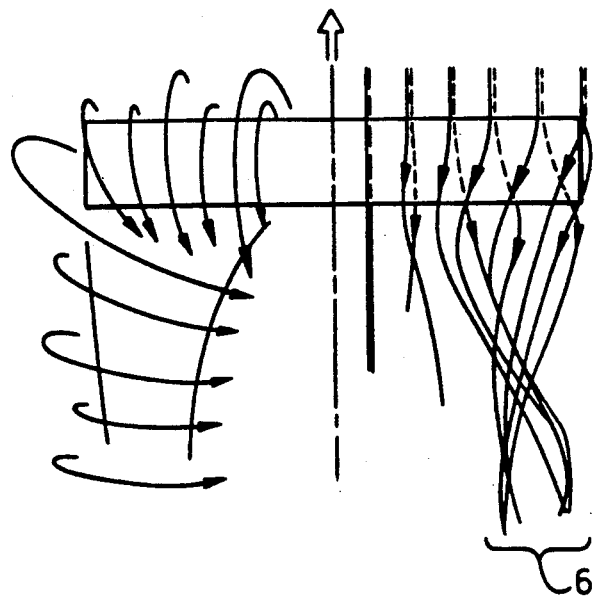
FIGS. 1 and 2 illustrate an aircraft wing, and the tip vortices produced by the wing.
Figure 2:
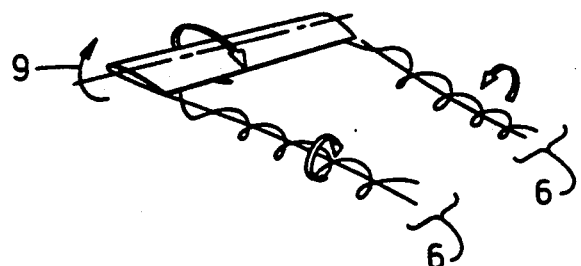
Figure 3:
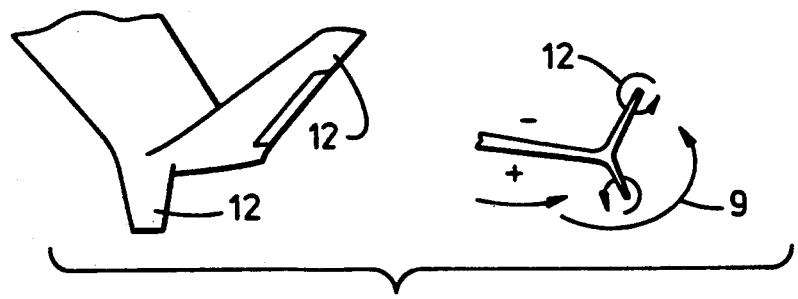
FIG. 3 illustrates winglets, which reduce the vortices of FIGS. 1 and 2.

Relative Mach No. Exceeds That for Winglets
FIGS. 3, 7, and 9

The ski-tips of FIG. 7 or 9 may be thought to resemble the winglet shown in FIG. 3. However, the relative mach number for the ski-tip is significantly greater than for known winglets. For example, it is believed that the maximum relative mach number of the winglet on a Boeing 747-400 is about 0.84. However, for the ski-tip shown in FIG. 16, wherein the propeller diameter is 12 feet, the rotational speed is about 1200 rpm, and the airspeed is about mach 0.80, the relative mach number near the tip region 70 is about 1.1, which is about 30 percent greater.

Blades Have Low-, Medium, and High Mach Regions

The blade in FIG. 14 can be divided into three regions, namely, low-, medium-, and high mach regions. One reason is that the relative mach number is determined by the vector sum of (a) incoming air speed plus (b) propeller tangential speed, as explained in connection with FIG. 25.

In the low mach region, the sweep is forward. In the medium mach region, sweep is aft. The ski-tip is located in the high mach region.

One Method of Construction

In principle, one way to manufacture the blade of FIG. 7 is to bend a pre-existing blade, such as that shown in FIG. 14, over the curved surface 73 in FIG. 9. This method uses both (a) the pre-existing foil sections and (b) pre-existing sweep of the blade of FIG. 14, and superimposes thereon the cahedral of curved surface 73.

For blades made of a fiber-resin composite, it may be preferable to make a mold by, first, bending a metal blade, having the shape shown in FIG. 14, over the curved surface 73 in FIG. 9, and then making a mold of the bent metal blade. The mold is used to construct the fiber-resin blade.

Numerous substitutions and modifications can be undertaken without departing from the true spirit and scope of the invention. What is desired to be secured by Letters Patent is the invention as defined in the following claims.

We claim:

1. An aircraft propeller system, comprising:
    a) forward and aft counterrotating propellers, each including a plurality of blades having curved leading edges, wherein said forward propeller blade leading edges are approximately mirror images of said aft propeller blade leading edges, except in the tip regions;
    b) a tip region on each of said forward propeller blades which has cahedral.

2. An aircraft propulsion system as recited in claim 1, further comprising:

a) on the blades of the forward propeller, a leading edge sweep near the tips which increase in magnitude toward the blade tips;
b) on the blades of the forward propeller, a trailing edge sweep near the tips which is less than the leading edge sweep directly forward of each trailing edge position; and
c) on the blades of the forward propeller, a blade line which follows a quasi-helical path near the tips.

3. An aircraft propulsion system, comprising:
a) a forward propeller which
  i) includes a plurality of blades, wherein
    A) part of each forward propeller blade produces a wake along its length which is generally crescent-shaped in cross-section; and
    B) each forward propeller blade includes a cahedral tip and a body section;
b) an aft propeller which
  i) rotates opposite to the forward propeller;
  ii) includes a plurality of blades, wherein
    A) each aft propeller blade includes a root;
    B) each aft propeller blade has a leading edge which is approximately crescent-shaped, but in mirror image to the wake's crescent cross-section; and
    C) each aft propeller blade leading edge cuts each crescent-shaped wake encountered by the leading edge in a scissoring action beginning at the root of the blade and ending at the tip of the blade, wherein the scissoring action produces a sequence of noise pulses spread over time and smaller in magnitude than a corresponding noise pulse which would be created if the leading edge cut the wake at one time with no scissoring action; and
c) wherein each of said forward propeller blade cahedral tips adds a wakelet to each of the crescent-shaped wakes, the wakelets having the same sense of curvature as the crescent-shaped wakes, thereby producing less wake-chopping noise than an aircraft propulsion system having wakelets with curvature opposite to those of respective wakes.

4. An aircraft propulsion system as recited in claim 3, wherein each of said forward propeller blade cahedral tips:
a) includes a fence and a blended region; and
b) reduces the strength of tip vortices shed by the forward propeller blades into the aft propeller blades, as compared with the strength of tip vortices shed by the aft propeller blades, thereby producing less noise than an aircraft propulsion system with forward and aft propeller blades where the forward propeller blade tips have no cahedral.

5. An aircraft propulsion system as recited in claim 4, wherein each of said forward propeller blade tip blended regions:
a) extends between said forward propeller blade tip fence and said forward propeller blade body section;
b) has a cahedral which increases toward said fence; and
c) includes a high pressure surface which is concave and has a radius of curvature exceeding 5 inches, thereby inhibiting shock formation.

6. An aircraft propulsion system as recited in claim 5, wherein each of said forward propeller blade body sections has a cahedral which ranges between 3° dihedral to 3° anhedral as measured with said forward propeller blades not rotating, for mechanical reasons including balancing, said blade body section cahedral reduced to approximately zero when said forward propeller blades rotate, due to blades centrifugal stresses.

7. An aircraft propulsion system as recited in claim 6, wherein each of said forward propeller blade cahedral tips can produce lift, thereby allowing a thrust loading on said forward propeller to be within ten percent of a thrust loading on said aft propeller even though said forward propeller is smaller in diameter than said aft propeller due to said forward propeller blade cahedral tips.

8. An aircraft propulsion system as claimed in claim 7, wherein said forward propeller blade cahedral tips are configured such that when pitch of the forward propeller blades changes, pitch angles in said cahedral tips change in unison with pitch angles in said forward propeller blade body sections.

9. An aircraft propulsion system as recited in claim 8, wherein said propulsion system further comprises
a) on the blades of the forward propeller, a leading edge sweep angle near said cahedral tips which increases in magnitude toward said tips, wherein said leading edge sweep angle changes as pitch of said forward propeller blades changes;
b) on the blades of the forward propeller, a trailing edge sweep angle near said cahedral tips which is less than said leading edge sweep angle directly forward of each trailing edge position; and
c) on the blades of the forward propeller exclusively, a blade line which follows a quasi-helical path near said cahedral tips.

* * * * *